US011788892B2

(12) United States Patent
Ichioka et al.

(10) Patent No.: US 11,788,892 B2

(45) Date of Patent: Oct. 17, 2023

(54) INSPECTING APPARATUS, AND AN INKJET PRINTING APPARATUS HAVING THE SAME

(71) Applicant: SCREEN HOLDINGS CO., LTD., Kyoto (JP)

(72) Inventors: Yoshikazu Ichioka, Kyoto (JP); Makoto Shiomi, Kyoto (JP); Shinsuke Yamashita, Kyoto (JP); Shinji Hayashi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 85 days.

(21) Appl. No.: 17/362,216

(22) Filed: Jun. 29, 2021

(65) Prior Publication Data

US 2022/0090967 A1 Mar. 24, 2022

(30) Foreign Application Priority Data

Sep. 18, 2020 (JP) ................................ 2020-157326

(51) Int. Cl.

*B41J 29/393* (2006.01)

*G01J 3/46* (2006.01)

(Continued)

(52) U.S. Cl.

CPC . *G01J 3/46* (2013.01); *B41J 2/21* (2013.01); *B41J 15/04* (2013.01); *B41J 29/393* (2013.01)

(58) Field of Classification Search

CPC .... B41F 33/0036; B41J 29/393; B41J 2/0451; B41J 2/04558; B41J 2/0456;

(Continued)

(56) References Cited

U.S. PATENT DOCUMENTS

| | | | |
|---|---|---|---|
| 2007/0139703 A1 | 6/2007 | Shimamura et al. | |
| 2014/0190362 A1 | 7/2014 | Weidmann | |

(Continued)

FOREIGN PATENT DOCUMENTS

| | | | |
|---|---|---|---|
| EP | 1 798 665 A2 | 12/2006 | |
| JP | 2007-205921 A | 8/2007 | |

(Continued)

OTHER PUBLICATIONS

European Search Report of corresponding European Patent Application No. 21183890.9 dated Apr. 14, 2022 (20 pages).

(Continued)

*Primary Examiner* — Julian D Huffman

(74) *Attorney, Agent, or Firm* — McDermott Will & Emery LLP

(57) ABSTRACT

An inspecting apparatus for inspecting print images printed on a transparent printing medium. The apparatus includes a first transport roller for transporting the transparent printing medium; a second transport roller spaced from the first transport roller, and disposed downstream in a transport direction, for transporting the transparent printing medium; a photographing device for photographing the print images located in an inspection area; and a light emitting device for emitting light for photographing the print images located in the inspection area. The first transport roller and second transport roller have outer circumferential surfaces thereof each with a light absorbing member for absorbing the light from the light emitting device.

5 Claims, 10 Drawing Sheets

(51) Int. Cl.
*B41J 2/21* (2006.01)
*B41J 15/04* (2006.01)

(58) Field of Classification Search
CPC .. B41J 2/16579; B41J 2/2141; B41J 11/0095; B41J 11/009; B41J 11/057; B41J 2203/01; B41J 2203/011; G01N 21/86; G01N 21/89; G01N 33/34; G01N 33/343; G01N 33/346; G01N 2021/8663
See application file for complete search history.

(56) References Cited

U.S. PATENT DOCUMENTS

| | | | |
|---|---|---|---|
| 2014/0208970 A1 | 7/2014 | Weidmann | |
| 2017/0088941 A1 | 3/2017 | Schroeder et al. | |
| 2019/0358978 A1* | 11/2019 | Yamamoto | B41J 13/076 |
| 2021/0033463 A1 | 2/2021 | Ichioka | |

FOREIGN PATENT DOCUMENTS

| | | |
|---|---|---|
| JP | 6010980 B2 | 10/2016 |
| JP | 2019-142007 A | 8/2019 |
| WO | 2015/172848 A1 | 11/2015 |
| WO | 2017/071748 A1 | 5/2017 |
| WO | 2018/001523 A1 | 1/2018 |
| WO | 2019/187379 A1 | 10/2019 |

OTHER PUBLICATIONS

Partial European Search Report issued in corresponding European Patent Application No. 21183890.9-1017, dated Jan. 13, 2022.

* cited by examiner

INSPECTING APPARATUS, AND AN INKJET PRINTING APPARATUS HAVING THE SAME

BACKGROUND OF THE INVENTION

(1) Field of the Invention

This invention relates to an inspecting apparatus for reading images from a transparent printing medium transported by transport rollers to inspect print conditions, and to an inkjet printing apparatus having the inspecting apparatus.

(2) Description of the Related Art

The inkjet printing apparatus which prints images on a printing medium by dispensing ink droplets thereto is subject to various instances of trouble. These instances include trouble due to dispensation such as missing nozzles, horizontal jump of ink droplets, and dispensation at unspecified times of ink droplets (what is called dripping), trouble due to transportation of the printing medium such as skew, meandering, wrinkles, and so on, trouble of ink flow due to an insufficient drying of ink droplets, and contamination by re-adhesion due to contamination of rollers accompanying the ink flow. So, the inspecting apparatus is used to inspect printed images.

Conventionally, this type of apparatus includes a light source, and a reading sensor. See Japanese Patent No. 60109802 (FIG. 1), for example. The light source and reading sensor are arranged to face the same surface of a printing medium. The light emitted from the light source is reflected by the printing medium to fall on the reading sensor.

With such construction, the printing medium, when transparent, allows reflected light to pass through a transparent area. It is therefore difficult to distinguish between an image portion printed in black ink and a transparent portion. As a result, there arises a problem that an accurate inspection cannot be performed when the printing medium is transparent.

Then, there is an apparatus having a photographic device, a first light emitter, and a second light emitter. See Japanese Unexamined Patent Publication No. 2019-142007 (FIG. 5), for example. The first light emitter is disposed opposite the photographic device across the printing medium. The second light emitter is disposed at the same side as the photographic device. Consequently, transmitted light from the first light emitter falls on the photographic device. From the second light emitter, reflected light falls on the photographic device. This enables an accurate inspection even when the printing medium is transparent.

SUMMARY OF THE INVENTION

However, the conventional example with such construction has the following problem.

The conventional apparatus has transport rollers arranged upstream and downstream of the photographic device. Especially when the outer circumferential surfaces of the transport rollers are silver-colored, strong reflections occur from the transport rollers. Consequently, the lights reflected from the transport rollers may cause noise for the photographic device to impair precise inspection. Note that this problem may arise even when the construction includes no second light emitter as light source of reflected light.

This invention has been made having regard to the state of the art noted above, and its object is to provide an inspecting apparatus and an inkjet printing apparatus having the inspecting apparatus, which can perform an accurate inspection by suppressing noise due to lights reflected from transport rollers.

To fulfill the above object, this invention provides the following construction.

This invention provides an inspecting apparatus for reading print images printed on a transparent printing medium and inspecting printing states, the apparatus comprising a first transport roller for transporting the transparent printing medium; a second transport roller spaced from the first transport roller, and disposed downstream in a transport direction, for transporting the transparent printing medium; a photographing device disposed between the first transport roller and the second transport roller, and opposed to one surface of the transparent printing medium, for photographing the print images located in an inspection area set between the first transport roller and the second transport roller; and a light emitting device for emitting light for the photographing device to photograph the print images located in the inspection area; wherein the first transport roller and the second transport roller have outer circumferential surfaces thereof each with a light absorbing member for absorbing the light from the light emitting device.

According to this invention, the first transport roller and second transport roller have outer circumferential surfaces thereof each with a light absorbing member for absorbing the light from the light emitting device. This construction can inhibit the light emitted from the light emitting device from reflecting from the first transport roller and second transport roller. As a result, noise due to the light reflected from the first transport roller and second transport roller can be suppressed. Thus, an accurate inspection can be performed.

In this invention, it is preferred that the light absorbing member is a black tape provided with antireflection treatment.

The outer circumferential surfaces of the first transport roller and second transport roller are formed of black tapes provided with antireflection treatment (e.g. pearskin treatment). This construction can be realized at low cost. Further, since the black tapes are simply wound, this measure is easily applicable also to existing apparatus.

In this invention, it is preferred that the light absorbing member is a needlelike construction with numerous recesses and numerous projections, and with a black coat.

The outer circumferential surfaces of the first transport roller and second transport roller are each formed of a needlelike construction with numerous recesses and numerous projections, and with a black coat. This assures excellent durability, which can maintain the effect over a long period of time.

This invention provides an inspecting apparatus for reading print images printed on a transparent printing medium and inspecting printing states, the apparatus comprising a first transport roller for transporting the transparent printing medium; a second transport roller spaced from the first transport roller, and disposed downstream in a transport direction, for transporting the transparent printing medium; a photographing device disposed between the first transport roller and the second transport roller, and opposed to one surface of the transparent printing medium, for photographing the print images located in an inspection area set between the first transport roller and the second transport roller; a light emitting device for emitting light for the photographing device to photograph the print images located in the inspection area; and a light irradiation restricting device for restricting irradiation of the first transport roller and the second transport roller by the light from the light emitting device.

The light irradiation restricting device restricts irradiation of the first transport roller and second transport roller by the light from the light emitting device. This construction can prevent noise due to the light reflected from the first transport roller and second transport roller. Thus, an accurate inspection can be performed.

In this invention, it is preferred that the light irradiation restricting device comprises the light emitting device which emits light to a range including the inspection area except the first transport roller and the second transport roller.

The light emitting device serves as the light irradiation restricting device, and emits light to a range including the inspection area except the first transport roller and the second transport roller. Thus, the problem due to the reflected light from the first transport roller and second transport roller can be solved by devising only the light emitting device.

In this invention, it is preferred that the light irradiation restricting device includes hoods for preventing the light from the light emitting device from irradiating the first transport roller and the second transport roller.

The light irradiation restricting device includes hoods for preventing the light from the light emitting device from irradiating the first transport roller and the second transport roller. Consequently, the problem due to the reflected lights from the first transport roller and second transport roller can be solved only by providing the hoods for the light emitting device. Thus, this construction is easily applicable also to existing apparatus.

In this invention, the light irradiation restricting device comprises a distance in the transport direction between the first transport roller and the second transport roller set so that the first transport roller and the second transport roller are outside areas irradiated by the light from the light emitting device.

The light irradiation restricting device is in the form of the distance in the transport direction between the first transport roller and the second transport roller, which distance is set so that the first transport roller and the second transport roller are outside areas irradiated by the light from the light emitting device. Consequently, the problem due to the reflected lights from the first transport roller and second transport roller can be solved without adding a new construction.

In this invention, it is preferred that the light irradiation restricting device comprises a placement in which the photographing device, with reference to the transparent printing medium transported between the first transport roller and the second transport roller, is located in a position between the first transport roller and the second transport roller and on the same side as the first transport roller and the second transport roller.

With reference to the transparent printing medium transported between the first transport roller and the second transport roller, the photographing device is located in a position between the first transport roller and the second transport roller and on the same side as the first transport roller and the second transport roller. The light irradiation restricting device comprises such placement. This can inhibit lights reflected by opposed outer circumferential surfaces of the first transport roller and second transport roller from entering the photographing device. Consequently, the problem due to the reflected lights from the first transport roller and second transport roller can be solved only by changing the position of the photographing device.

In this invention, it is preferred that the photographing device has a moving mechanism for fixing the photographing device in a position relative to the inspection area at a time of operation, and for moving the photographing device in a direction spaced from the inspection area and away from a plane of the transparent printing medium at a time of maintenance.

The moving mechanism can move the photographing device away from the plane of the transparent printing medium. Consequently, powder and the like released from the transparent printing medium can easily be removed from the photographing device. This enables accurate inspection to be performed over a long period of time.

In this invention, it is preferred that the inspecting apparatus comprises an apparatus frame to which the first transport roller and the second transport roller are rotatably attached; wherein the moving mechanism includes a photographing device frame having a long axis extending in a transverse direction of the transparent printing medium, and attached with the photographing device mounted thereon to the apparatus frame; and a pivot axis extending parallel to the plane of the transparent printing medium, and disposed adjacent one end of the photographing device frame.

The photographing device frame has a pivot axis disposed adjacent one end thereof to be parallel to the plane of the transparent printing medium. Thus, the photographing device frame has the other end swingable about the one end relative to the plane of the transparent printing medium. Consequently, maintenance can be performed only by swinging the photographing device frame away from the plane of the transparent printing medium.

In this invention, it is preferred that the apparatus frame includes a frame positioning pin for restricting position of the other end of the photographing device frame to place the photographing device in a focusing position where the photographing device focuses on the print images on the transparent printing medium.

The frame positioning pin restricts the position of the other end of the photographing device frame to place the photographing device in a focusing position. Consequently, photography by the photographing device restored after swinging the photographing device frame can be performed appropriately.

In this invention, it is preferred that the photographing device frame includes rails arranged adjacent opposite ends of the photographing device in the transverse direction of the transparent printing medium for enabling the opposite ends of the photographing device to move relative to the transparent printing medium; and photographing device positioning pins for restricting position of the photographing device on the rails to be in a focusing position where the photographing device focuses on the print images on the transparent printing medium.

The photographing device frame includes rails and photographing device positioning pins. Thus, the photographing device is movable along the rails relative to the transparent printing medium, and is also fixable easily to the focusing position by the photographing device positioning pins. Consequently, even when the photographing device is moved at the time of maintenance, the photographing device can easily be set to the focusing position.

In this invention, it is preferred that printing heads are arranged upstream of the inspecting apparatus for printing images by dispensing ink droplets to the transparent printing medium; and the inspecting apparatus is configured to inspect the images printed by the printing heads.

The inspecting apparatus inspects the images printed by the printing heads on the transparent printing medium. In the inspecting apparatus, the light emitted from the light emitting device is inhibited from reflecting from the first transport roller and second transport roller. As a result, noise due to the light reflected from the first transport roller and second transport roller can be suppressed. Thus, an accurate inspection can be performed on the images printed in the inkjet printing apparatus.

This specification also discloses an invention relating to the following inspecting apparatus:

In a conventional apparatus, where the printing medium is film and the ink used for image formation is water-based ink, it is common practice to form a primer layer (also called a pretreatment layer, ink penetration layer, and so on) before printing for fixation of the water-based ink. Consequently, the powder of the primer layer may adhere to the photographing device, thereby interfering with accurate inspection. Also where the printing medium is paper, paper powder may adhere to the photographing device to cause the same problem. It is therefore necessary to clean regularly a light transmitting surface of the photographing device. However, where the image sensor of the photographing device is a CIS (contact image sensor), the depth of field is shallow. There is therefore a small distance between the light transmission surface of the photographing device and printing medium. This poses a problem that maintenance of the photographing device is difficult.

(1) An inspecting apparatus for reading print images printed on a printing medium and inspecting printing states, the apparatus comprising:

a first transport roller for transporting the printing medium;

a second transport roller spaced from the first transport roller, and disposed downstream in a transport direction, for transporting the printing medium;

a photographing device disposed between the first transport roller and the second transport roller, and opposed to one surface of the printing medium, for photographing the print images located in an inspection area set between the first transport roller and the second transport roller; and a light emitting device for emitting light for the photographing device to photograph the print images located in the inspection area;

wherein the photographing device has a moving mechanism for fixing the photographing device in a position relative to the inspection area at a time of operation, and for moving the photographing device in a direction spaced from the inspection area and away from a plane of the printing medium at a time of maintenance.

According to the invention set forth in (1) above, the moving mechanism can move the photographing device away from the plane of the printing medium. Consequently, powder and the like released from the printing medium can easily be removed from the photographing device. This enables accurate inspection to be performed over a long period of time.

(2) In the inspection apparatus set forth in (1) above, the inspecting apparatus comprises an apparatus frame to which the first transport roller and the second transport roller are rotatably attached;

wherein the moving mechanism includes a photographing device frame having a long axis extending in a transverse direction of the printing medium, and attached with the photographing device mounted thereon to the apparatus frame; and a pivot axis extending parallel to the plane of the printing medium, and disposed adjacent one end of the photographing device frame.

According to the invention set forth in (2) above, the photographing device frame has a pivot axis disposed adjacent one end thereof to be parallel to the plane of the printing medium. Thus, the photographing device frame has the other end swingable about the one end relative to the plane of the printing medium. Consequently, maintenance can be performed only by swinging the photographing device frame away from the plane of the printing medium.

(3) In the inspection apparatus set forth in (1) above, the apparatus frame includes a frame positioning pin for restricting position of the other end of the photographing device frame to place the photographing device in a focusing position where the photographing device focuses on printed images on the transparent printing medium.

According to the invention set forth in (3) above, the frame positioning pin restricts the position of the other end of the photographing device frame to place the photographing device in a focusing position. Consequently, photography by the photographing device restored after swinging the photographing device frame can be performed appropriately.

(4) In the inspection apparatus set forth in (1) above, the photographing device frame includes rails arranged adjacent opposite ends of the photographing device in the transverse direction of the transparent printing medium for enabling the opposite ends of the photographing device to move relative to the transparent printing medium; and photographing device positioning pins for restricting position of the photographing device on the rails to be in a focusing position where the photographing device focuses on printed images on the transparent printing medium.

According to the invention set forth in (4) above, the photographing device frame includes rails and photographing device positioning pins. Thus, the photographing device is movable along the rails relative to the printing medium, and is also fixable easily to the focusing position by the photographing device positioning pins. Consequently, even when the photographing device is moved at the time of maintenance, photography by the photographing device can be performed appropriately.

(5) In the inspection apparatus set forth in (1) to (4) above, an inkjet printing apparatus comprises printing heads arranged upstream of the inspecting apparatus for printing images by dispensing ink droplets to the printing medium;

wherein the inspecting apparatus is configured to inspect the images printed by the printing heads.

According to the invention set forth in (5) above, the inspecting apparatus inspects the images printed on the printing medium by the printing heads. In the inspecting apparatus, the light emitted from the light emitting device is inhibited from reflecting from the first transport roller and second transport roller. As a result, noise due to the light reflected from the first transport roller and second transport roller can be suppressed. Thus, an accurate inspection can be performed on the images printed in the inkjet printing apparatus.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Various embodiments of this invention in an inkjet printing apparatus having inspecting devices will be described hereinafter.

Embodiment 1

Embodiment 1 of this invention will be described hereinafter with reference to the drawings.

Figure 1:
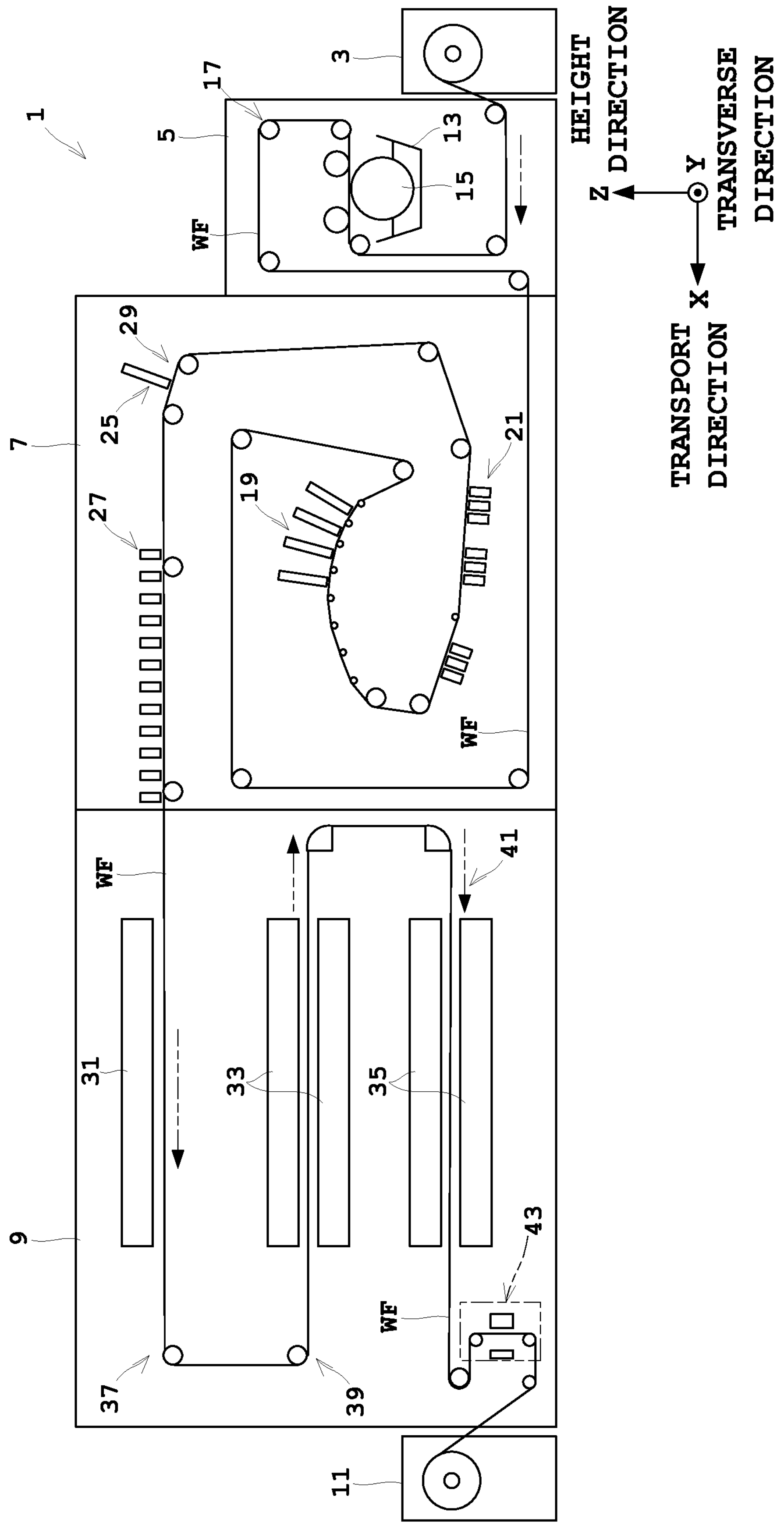
FIG. 1 is an outline schematic view showing an entire inkjet printing apparatus according to the embodiments.

FIG. 1 is an outline schematic view showing an entire inkjet printing apparatus according the embodiments.

An inkjet printing apparatus 1 includes a sheet feeder 3, a coating unit 5, a printing unit 7, a main drying unit 9, and a takeup roller 11. FIG. 1 shows a transport direction X extending from right to left therein, with the left side being downstream, and the right side upstream. Where convenient, the directions may be expressed with signs attached, e.g. +X direction indicating leftward, and −X direction indicating rightward, with reference to a certain position. The direction of depth from the plane of the drawing in FIG. 1 is regarded as transverse direction Y. The up-down direction in FIG. 1 is height direction Z. The above-mentioned sheet feeder 3, coating unit 5, printing unit 7, main drying unit 9, and takeup roller 11 are arranged in the stated order downstream in the transport direction X.

The sheet feeder 3 supplies the coating unit 5 with soft wrapping film WF to be printed. The soft wrapping film WF in this embodiment is a transparent film, for example. The sheet feeder 3 holds a roll of soft wrapping film WF to be rotatable about a horizontal axis. The sheet feeder 3 unwinds the soft wrapping film WF, with a printing surface turned upward, into the coating unit 5. The material of soft wrapping film WF is a hydrophobic base material, for example, with a low absorbency for water-based ink. The soft wrapping film WF may be plastic film such as polypropylene resin, vinyl chloride resin, and polyimide resin, for example.

The soft wrapping film WF noted above corresponds to the "transparent printing medium" in this invention.

The coating unit 5 coats the soft wrapping film WF with a primer for forming a primer layer thereon. The primer layer is also called a pretreatment layer, ink penetration layer, and ink absorbing layer. The primer is a coating solution and is also called a base coating solution, and surface preparation solution. Specifically, the coating unit 5 has a pan 13, a gravure roller 15, and a transport device 17. The pan 13 stores the primer. The gravure roller 15 has a lower portion thereof partially immersed in the primer stored in the pan 13 and, by rotating, an upper portion supplying the primer to the printing surface of soft wrapping film WF. The transport device 17 unwinds the soft wrapping film WF from the sheet feeder 3, and transports the soft wrapping film WF to the gravure roller 15. In the area where the primer is supplied to the gravure roller 15, the transport direction of the soft wrapping film WF is opposite to the rotating direction of the circumferential surface of the gravure roller 15. The primer is applied to the soft wrapping film WF by what is called the reverse kiss mode. The transport device 17 transports the soft wrapping film WF from the coating unit 5 to the printing unit 7, with the soft wrapping film WF having the printing surface coated with the primer and facing up.

The primer includes a resin, polyvalent metallic salt, alcohol, surface tension regulator, or deionized water, for example. The resin may be shellac, for example. The polyvalent metallic salt may be calcium lactate, for example. The alcohol may be ethanol, for example. The surface tension regulator may be SY-Glyster, for example.

The printing unit 7 has a color printing section 19, a predrying section 21, a white printing section 25, an upper drying section 27, and a transport device 29. The color printing section 19, by dispensing multicolor inks, for example, prints color images on the printing surface of soft wrapping film WF coated with the primer layer. The predrying section 21 dries by way of pretreatment the printing surface of soft wrapping film WF having gone through the color printing. The white printing section 25 prints white images by dispensing white ink on the printing surface of soft wrapping film WF having gone through the color printing. The upper drying section 27 dries the printing surface of soft wrapping film WF where the white images have been printed. The transport device 29 transports the soft wrapping film WF from the color printing section 19 to the upper drying section 27.

The main drying unit 9 carries out a process of drying both the printing surface of soft wrapping film WF printed in the printing unit 7 and the reverse surface. Specifically, the main drying unit 9 has a first drying section 31, a second drying section 33, a third drying section 35, a first transport device 37, a second transport device 39, and a third transport device 41. The first drying section 31 dries the printing surface of soft wrapping film WF transported downstream in the transport direction X by the first transport device 37. The second drying section 33 dries both surfaces of soft wrapping film WF transported upstream in the transport direction X by the second transport device 39. The third drying section 35 dries both surfaces of soft wrapping film WF transported downstream in the transport direction X by the third transport device 41. The first drying section 31, second drying section 33, and third drying section 35 blow a gas heated to a predetermined temperature to the soft wrapping film WF. This dries the images printed on the printing surface of soft wrapping film WF. The main drying unit 9 blows out the gas at 80-90° C. at a flow speed of 27-30 m/s, for example.

In this embodiment, an inspecting section 43 is provided in the most downstream position inside the main drying unit 9. The detailed construction of this inspecting section 43 will be described hereinafter. The inspecting section 43 corresponds to the "inspecting apparatus" in this invention.

The takeup roller 11 winds up the soft wrapping film WF having gone through the drying process by the main drying unit 9, into a roll form around a horizontal axis.

Figure 2:
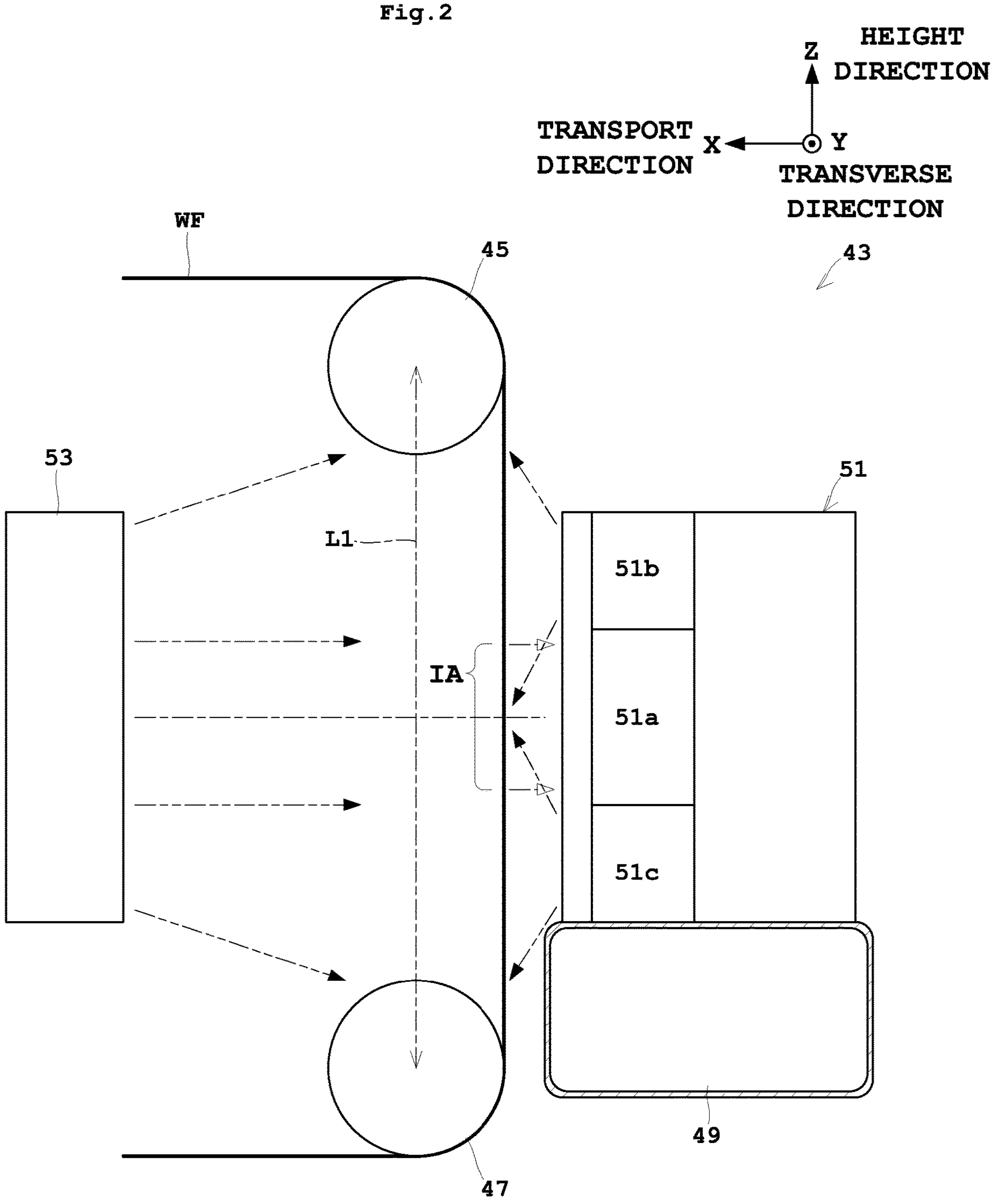
FIG. 2 is a side view showing a principal portion of an inspecting section.
Figure 3:
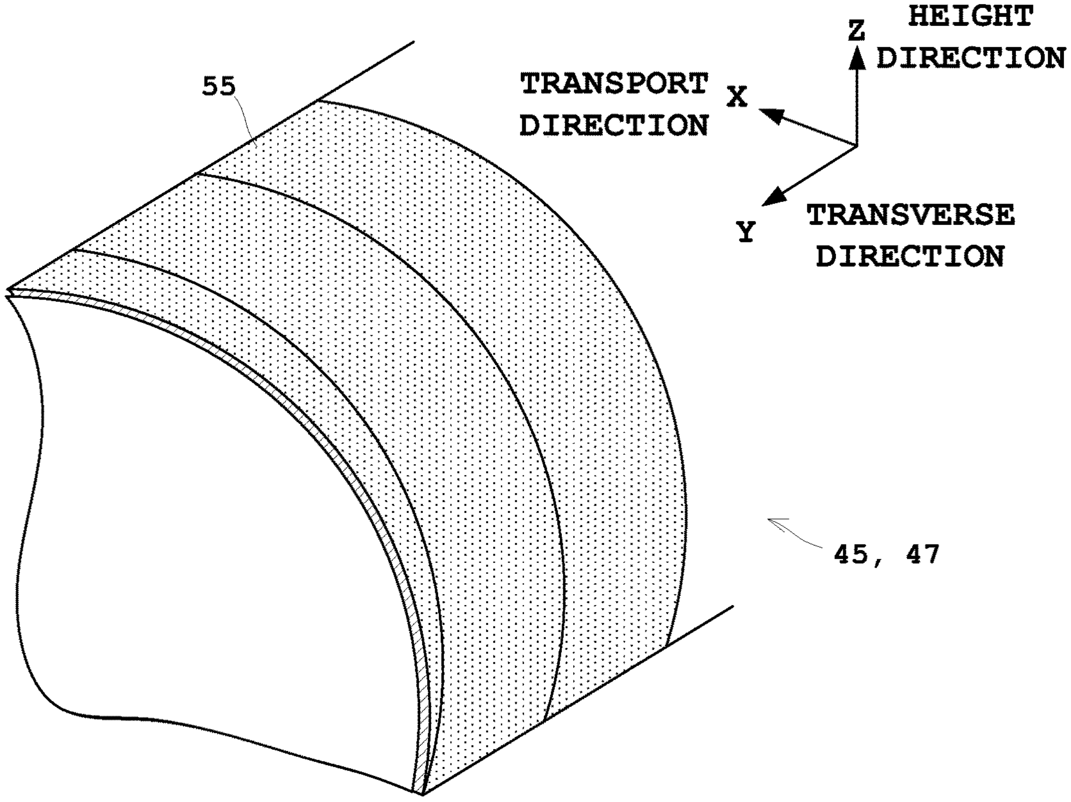
FIG. 3 is a perspective view showing the construction of a transport roller in Embodiment 1.

The inspecting section 43 will now be described with reference to FIGS. 2 and 3. FIG. 2 is a side view showing a principal portion of the inspecting section. FIG. 3 is a perspective view showing the construction of a transport roller in Embodiment 1.

The inspecting section 43 has a transport roller 45, a transport roller 47, a frame 49, a photographing device 51, and a transmitted light source 53.

The transport roller 45 and transport roller 47 transport the soft wrapping film WF. Specifically, the transport roller 45 feeds in the film WF from a left side in the transport direction X, and turns and feeds the film WF downward in the height direction Z. The transport roller 47 is located downward in the height direction Z from the transport roller 45. The transport roller 47 is located to have its center of rotation spaced a distance L1 from the center of rotation of the transport roller 45. The distance L1 is 100 mm, for example. The transport roller 47 changes and feeds the soft wrapping film WF from downward to leftward in the transport direction X.

The frame 49 is disposed in a position in the height direction Z between the transport rollers 45 and 47 and opposed to the transport rollers 45 and 47 across the soft wrapping film WF (in the −X direction). In particular, the frame 49 is located rightward in the transport direction X of the transport roller 47. The frame 49 is attached to an apparatus frame (not shown) which rotatably holds the transport rollers 45 and 47. The frame 49 is formed of a cylindrical member, for example. The frame 49 is elongated in the transverse direction Y. The frame 49 has the photographing device 51 mounted on an upper surface thereof. The photographing device 51 is elongated in the transverse direction Y as is the frame 49.

The photographing device 51 has an image sensor 51*a* in a middle portion thereof. The photographing device 51 has an upper reflected light source 51*b* above the image sensor 51*a* in the height direction Z. The photographing device 51 has a lower reflected light source 51*c* below the image sensor 51*a* in the height direction Z. The image sensor 51*a* is a CIS (contact image sensor), for example. The upper reflected light source 51*b* and lower reflected light source 51*c* emit lights leftward in the transport direction X from the photographing device 51, that is to the opposite side toward the printing surface of the soft wrapping film WF transported by the transport rollers 45 and 47. The upper reflected light source 51*b* and lower reflected light source 51*c* are formed of light emitting diodes, for example. The transmitted light source 53 is located opposite the photographing device 51 in the transport direction X across the soft wrapping film WF. The transmitted light source 53 is formed of a light emitting diode, for example. The above upper reflected light source 51*b*, lower reflected light source 51*c*, and transmitted light source 53 mainly emit lights to the soft wrapping film WF. However, the lights from the upper reflected light source 51*b* and transmitted light source 53 are emitted also to the lower outer circumferential surface of the transport roller 45. The lights from the lower reflected light source 51*c* and transmitted light source 53 are emitted also to the upper outer circumferential surface of the transport roller 47.

The above photographing device 51 takes photographs between the transport rollers 45 and 47. Specifically, the photographing device 51 takes photographs of an inspection area IA. The inspection area IA is located between the transport rollers 45 and 47, and is set to a substantially middle part of the distance L1. The above photographing device 51 detects reflected light and transmitted light from the inspection area IA with the image sensor 51*a*, thereby to read print images printed on the printing surface of soft wrapping film WF.

The transport rollers 45 and 47 noted above are conventionally used metal rollers. For example, the transport rollers 45 and 47 have silver-colored outer circumferential surfaces. In this embodiment, the outer circumferential surfaces of these transport rollers 45 and 47 have been treated.

Specifically, the treatment is as shown in FIG. 3.

Each of the transport rollers 45 and 47 has a narrow black tape 55 spirally wound on the outer circumferential surface about the long axis of the transport roller 45 or 47. The black tape has been provided with antireflection treatment on its surface. The antireflection treatment is performed, for example, in the form of pearskin treatment to provide matting effect. By way of antireflection treatment, antireflection film may be coated on the surface of black tape. A black tape 55 having a width corresponding to the length in the transverse direction Y of the transport rollers 45 and 47 may be wound to make only one round on the outer circumferential surface of each transport roller 45 or 47.

The above transport roller 45 corresponds to the "first transport roller" in this invention. The transport roller 47 corresponds to the "second transport roller" in this invention. The upper reflected light source 51*b*, lower reflected light source 51*c*, and the transmitted light source 53 correspond to the "light emitting device" in this invention. The black tape 55 corresponds to the "light absorbing member" in this invention.

The inspecting section 43 in this embodiment includes the black tapes 55 wound on the outer circumferential surfaces of the transport rollers 45 and 47 for absorbing the lights from the upper reflected light source 51*b*, lower reflected light source 51*c*, and transmitted light source 53. Consequently, the emitted lights are inhibited from reflecting from the lower outer circumferential surface of the transport roller 45 and the upper outer circumferential surface of the transport roller 57. As a result, noise in the photographing device 51 due to the lights reflected from the transport rollers 45 and 47 can be suppressed. The inspecting section 43 can perform accurate inspection. The use of black tapes 55 contributes to low cost. Further, the black tapes 55, which are simply wound for use, are easily applicable also to existing apparatus.

Figure 4:
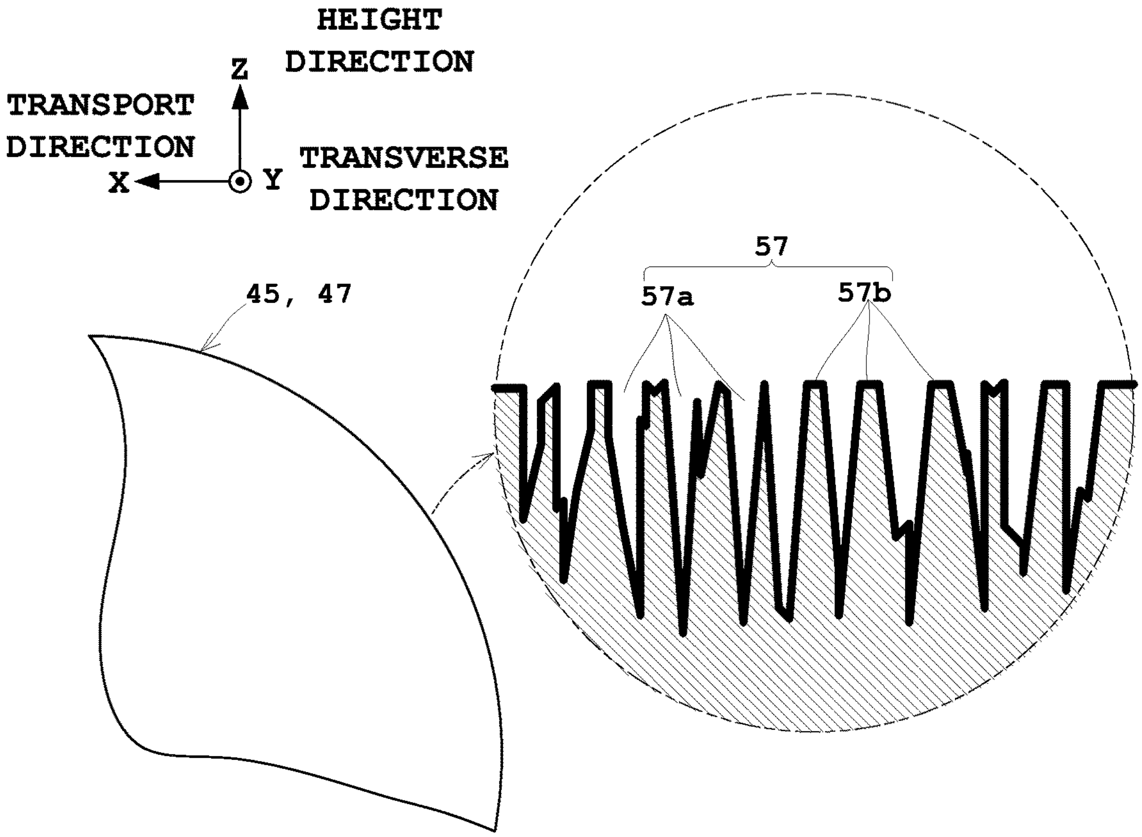
FIG. 4 is a view in vertical section showing the construction of a transport roller in a modified example with a portion thereof enlarged.

This invention is not limited to the foregoing embodiment, but may be modified as the following example. Reference is made to FIG. 4. FIG. 4 is a view in vertical section showing the construction of a transport roller in the modified example, with a portion thereof enlarged.

In this modified example, the outer circumferential surfaces of the transport rollers 45 and 47 have a needlelike construction 57. Specifically, the needlelike construction 57 is formed of numerous recesses 57*a* and numerous projections 57*b*. Their surfaces are covered with a black coat. In this construction, the outer circumferential surfaces of transport rollers 45 and 57 are formed of light absorbing members. Specifically, the recesses 57*a* and projections 57*b* in the needlelike construction 57 on the outer circumferential surfaces of transport rollers 45 and 57 preferably are in an aspect ratio of 2 or more and not exceeding 30. With such a construction, the lights emitted to the needlelike construction 57 are absorbed by the needlelike construction, whereby reflection can be suppressed. Further, the black coat preferably is a conductive metal. A conductive metal, with static electricity, can inhibit powder entering the transport rollers 45 and 47. This can prevent lowering of the light absorbing performance due to the entry of powder. Consequently, performance can be maintained over a long period of time.

As described above, the outer circumferential surfaces of transport rollers 45 and 47 have the needlelike construction 57 with numerous recesses 57*a* and numerous projections 57, which are coated with the black coat. Consequently, durability is made excellent, and the effect can be maintained over a long period of time.

Embodiment 2

Figure 5:
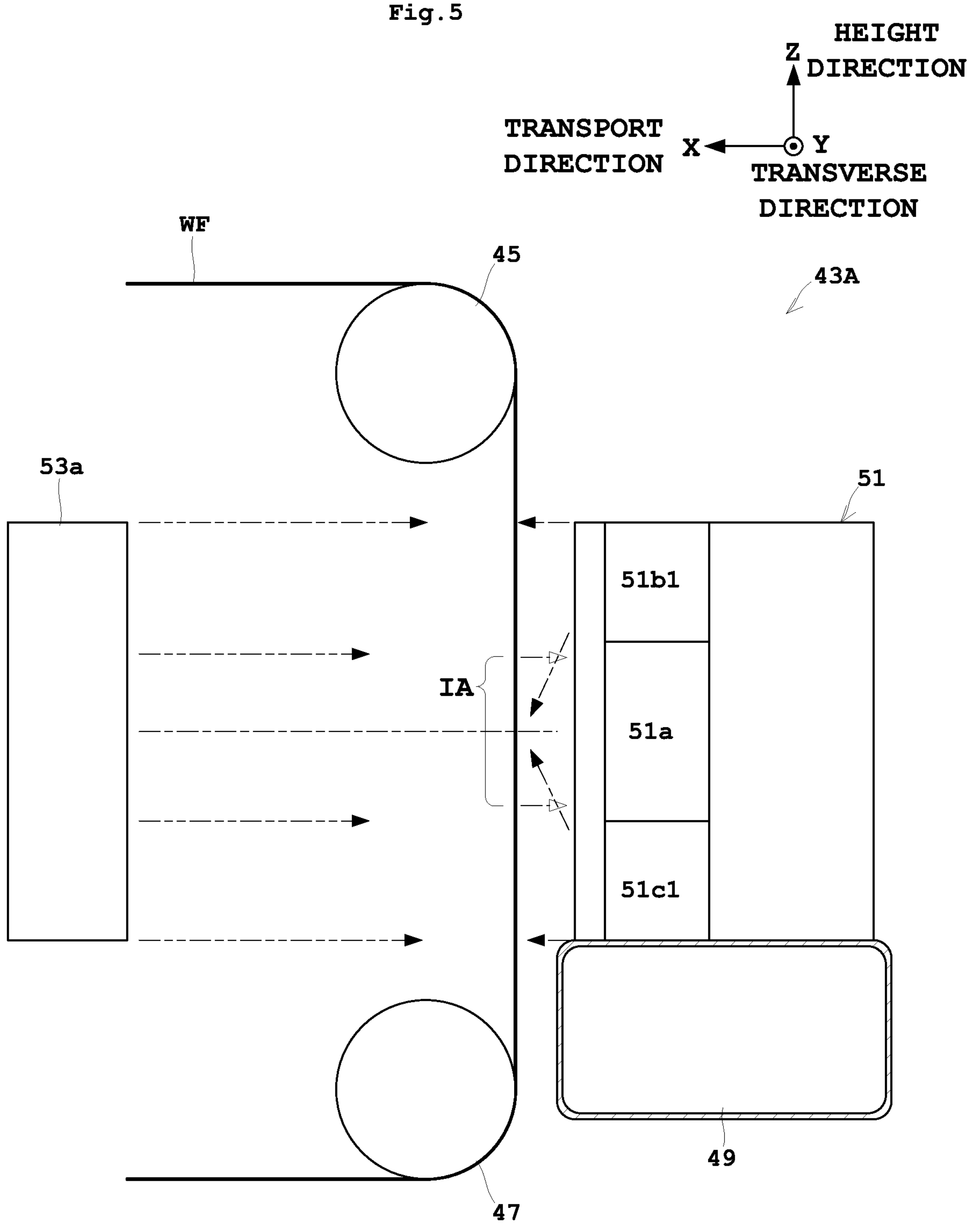
FIG. 5 is a side view showing a principal portion of an inspecting section in Embodiment 2.

Next, Embodiment 2 of this invention will be described with reference to the drawings. FIG. 5 is a side view showing a principal portion of an inspecting section in Embodiment 2.

An inspecting section 43A in Embodiment 2 is constructed as follows.

The inspecting section 43A is different from the foregoing inspecting section 43 in the construction of an upper reflected light source 51*b*1, a lower reflected light source 51*c*1, and a transmitted light source 53*a*. Specifically, the upper reflected light source 51*b*1 and lower reflected light source 51*c*1 emit lights to the soft wrapping film WF from the right side in the transport direction X. However, the upper reflected light source 51*b*1 and lower reflected light source 51*c*1 have their light emitting directions narrowed. In other words, the upper reflected light source 51*b*1 and lower reflected light source 51*c*1 have directionality. This directionality effects restrictions, with respect to the height direction Z, on the light emission to the lower outer circumferential surface of the transport roller 45, and on the light emission to the upper outer circumferential surface of the transport roller 47. However, the above directionality allows the light emission to the inspection area IA. The transmitted light source 53*a* also has a similar directivity. Such directivity can be realized by devising lens shapes of the light sources, for example.

The above upper reflected light source 51*b*1, lower reflected light source 51*c*1, and transmitted light source 53*a* correspond to the "light irradiation restricting device" in this invention.

According to this embodiment, the problem due to the reflected light from the transport rollers 45 and 47 can be solved by devising only the construction for emitting light.

Embodiment 3

Figure 6:
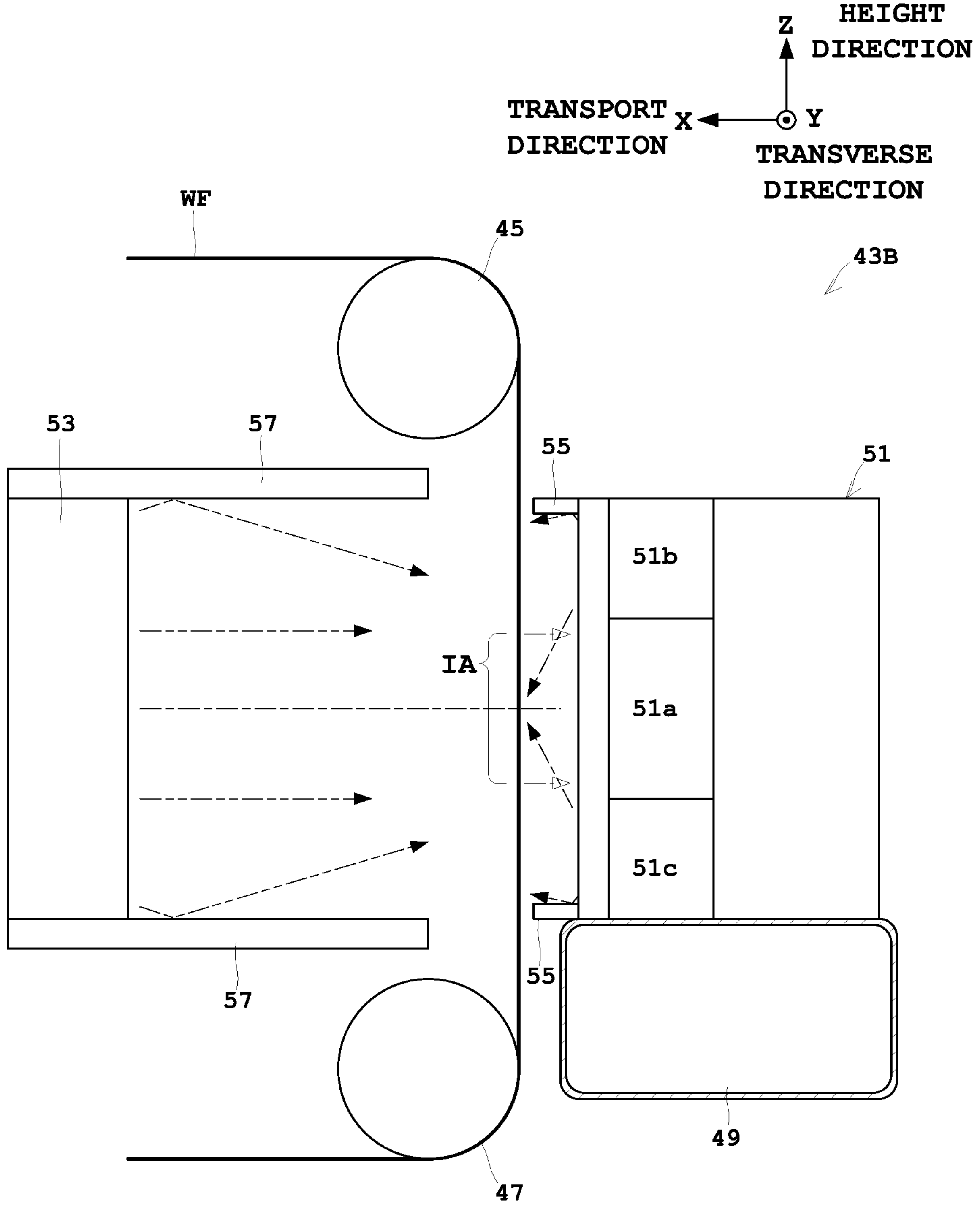
FIG. 6 is a side view showing a principal portion of an inspecting section in Embodiment 3.

Next, Embodiment 3 of this invention will be described with reference to the drawings. FIG. 6 is a side view showing a principal portion of an inspecting device in Embodiment 3.

An inspecting section 43B in Embodiment 3 is constructed as follows.

In the inspecting section 43B, the photographing device 51 has hoods 55, and the transmitted light source 53 has hoods 57. Specifically, the hoods 55 are attached to an upper part of the upper reflected light source 51*b* and a lower part of the lower reflected light source 51*c*. The hoods 57 are attached to an upper part and a lower part of the transmitted light source 53. The hoods 55 and 57 allow the light emission to the inspection area IA. On the other, the hoods 55 and 57 effect restrictions, with respect to the height direction Z, on the light emission to the lower outer circumferential surface of the transport roller 45, and on the light emission to the upper outer circumferential surface of the transport roller 47.

The above hoods 55 and 57 correspond to the "light irradiation restricting device" in this invention.

According to this embodiment, the hoods 55 and 57 are provided for preventing the light emission to the transport rollers 45 and 47. Consequently, the problem due to the reflected lights from the transport rollers 45 and 47 can be solved only by providing the hoods 55 for the upper reflected light source 51*b* and lower reflected light source 51*c*, and the hoods 57 for the transmitted light source 53. Consequently, this construction is easily applicable also to existing apparatus.

This invention is not limited to the embodiment having the hoods 55 attached to the photographing device 51, and the hoods 57 attached to the transmitted light source 53. That is, it will serve the purpose to arrange shielding members arranged in positions for obstructing the lights from the light sources reaching the outer circumferential surfaces of transport rollers 45 and 47. The arranging positions of the hoods 55 and hoods 57 are not limited to the positions described above.

Embodiment 4

Figure 7:
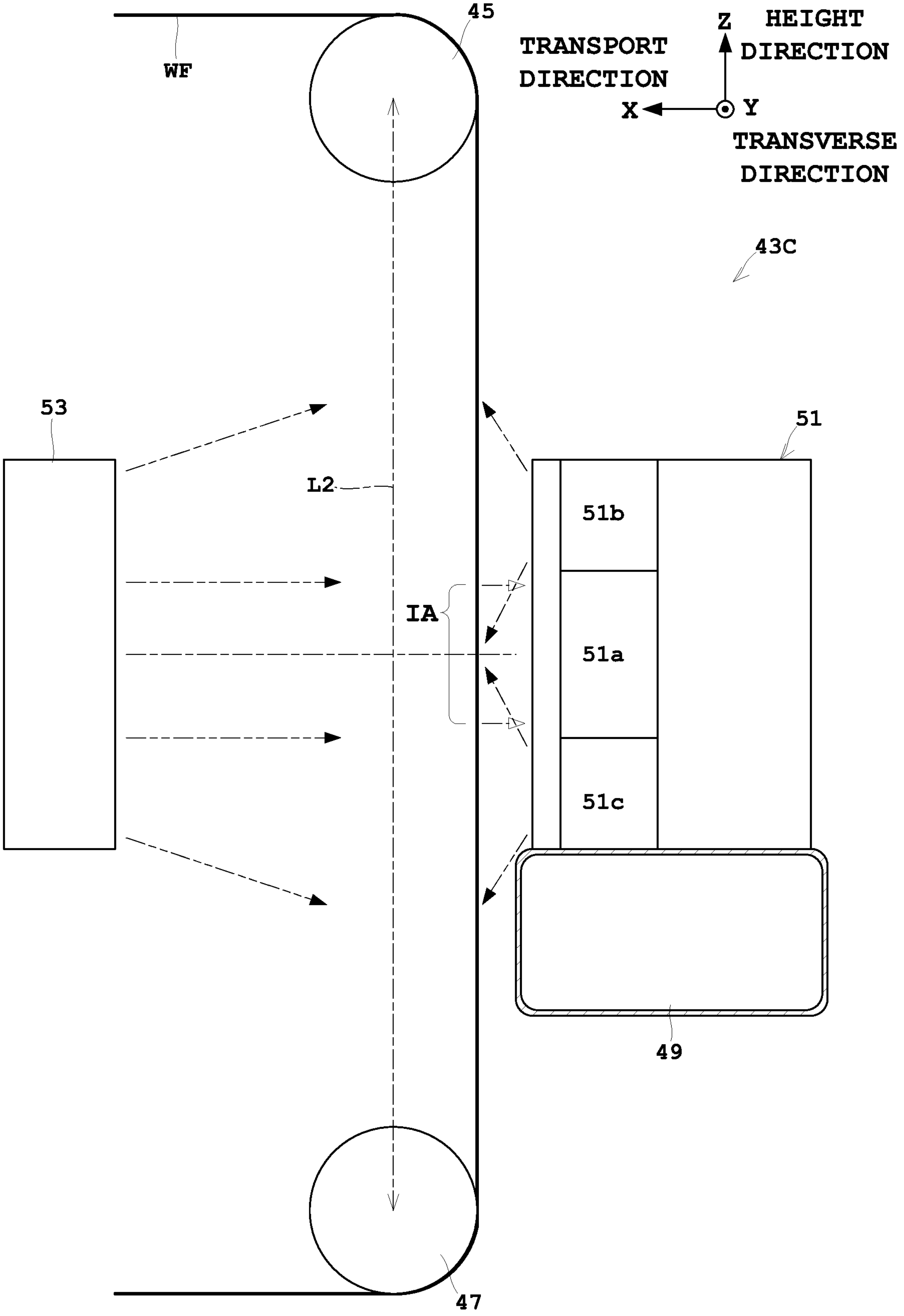
FIG. 7 is a side view showing a principal portion of an inspecting section in Embodiment 4.

Next, Embodiment 4 of this invention will be described with reference to the drawings. FIG. 7 is a side view showing a principal portion of an inspecting device in Embodiment 4.

An inspecting section 43C in Embodiment 4 is constructed as follows.

In the inspecting section 43B, the transport roller 45 and transport roller 47 are spaced apart by a distance L2 in the height direction Z therebetween. This distance L2 is longer than the distance L1 in the inspecting section 43 of Embodiment 1. The distance L2 is such a length that the lights from the upper reflected light source 51*b*, lower reflected light source 51*c*, and transmitted light source 53 do not irradiate the lower outer circumferential surface of the transport roller 45 or the upper outer circumferential surface of the transport roller 47. In other words, the transport roller 45 and transport roller 47 are arranged to have the lower outer circumferential surface of the transport roller 45 and the upper outer circumferential surface of the transport roller 47 located outside areas irradiated by the lights from the upper reflected light source 51*b*, lower reflected light source 51*c*, and transmitted light source 53.

The above transport rollers 45 and 47 arranged at the interval of distance L2 in the height direction Z correspond to the "light irradiation restricting device" in this invention.

According to this embodiment, the distance L2 between the transport roller 45 and transport roller 47 at opposite ends of the inspection area IA where the soft wrapping film WF is transported is set so that the transport roller 45 and transport roller 47 are outside the areas irradiated by the lights from the upper reflected light source 51*b*, lower reflected light source 51*c*, and transmitted light source 53. Consequently, the problem due to the reflected lights from the transport rollers 45 and 47 can be solved without adding a new construction.

Embodiment 5

Figure 8:
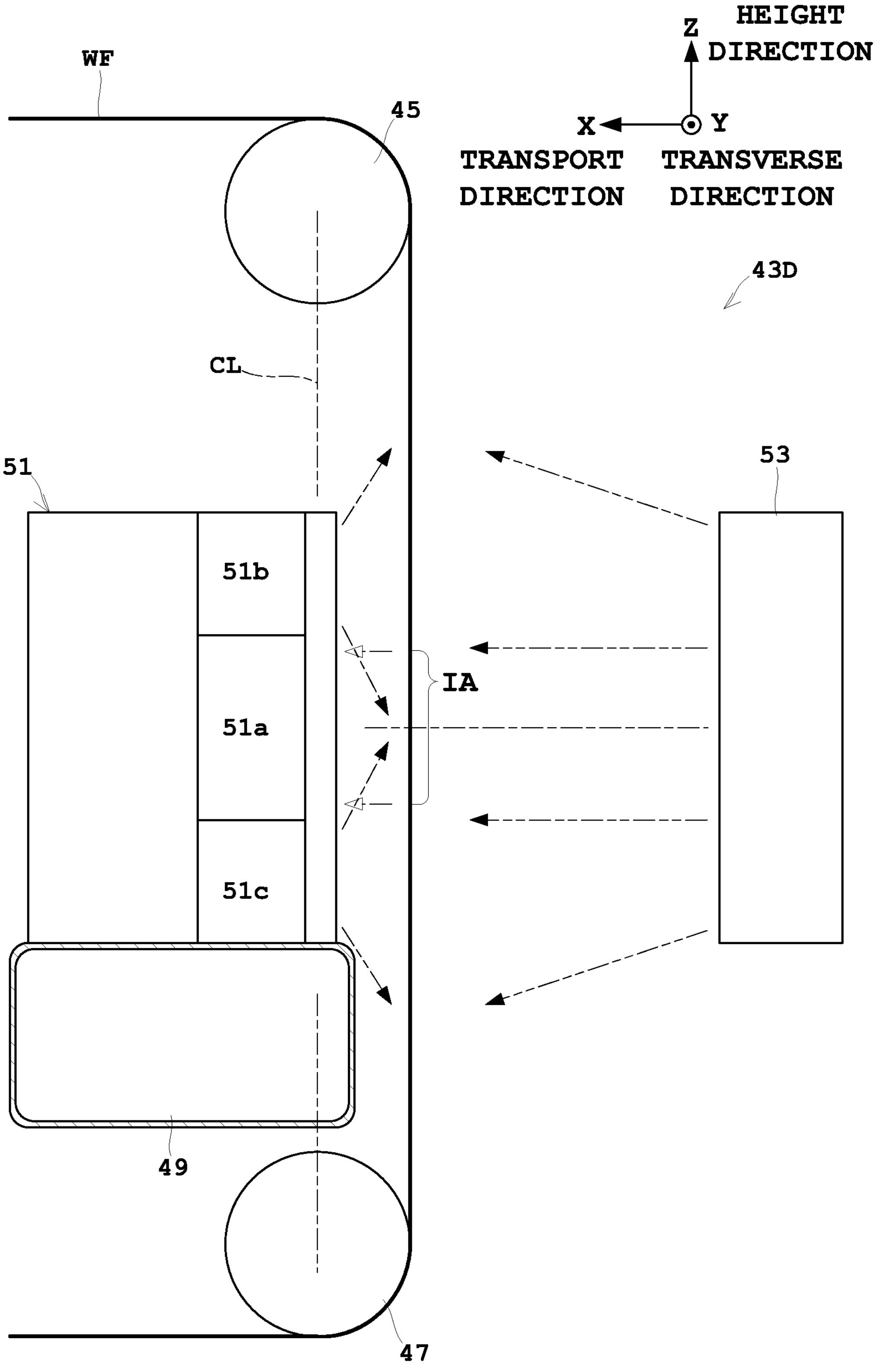
FIG. 8 is a side view showing a principal portion of an inspecting section in Embodiment 5.

Next, Embodiment 5 of this invention will be described with reference to the drawings. FIG. 8 is a side view showing a principal portion of an inspecting device in Embodiment 5.

An inspecting section 43D in Embodiment 5 is constructed as follows. The inspecting section 43D is, in the construction itself, the same as the inspecting section 43 in Embodiment 1 described hereinbefore. However, the positions of arrangement relative to the transport rollers 45 and 57 are different.

First, in the construction in this embodiment, the positions of the photographing device 51 and transmitted light source 53 opposed to each other across the soft wrapping film WF transported by the transport roller 45 and transport roller 47 are swapped with respect to the inspecting section 43 in Embodiment 1. Specifically, the inspecting section 43D has the photographing device 51 located on the lefthand side in the transport direction X of the soft wrapping film WF. The inspecting section 43D has the transmitted light source 53 located on the righthand side in the transport direction X of the soft wrapping film WF.

Further, the photographing device 51 is arranged in a position in the transport direction X different from the inspecting section 43 in Embodiment 1. The photographing device 51 in this embodiment, with reference to the soft wrapping film WF transported between the transport roller 45 and transport roller 47, is located in a position between the transport rollers 45 and 47 and on the same side as the transport rollers 45 and 47 (in the X-direction from the soft wrapping film WF. More preferably, the light incident surface of the image sensor 51*a* is located closer to a center line CL linking the rotation centers of the transport roller 45 and transport roller 47 than tangents to leftward outer circumferential surfaces of both the transport roller 45 and transport roller 47.

Thus, the photographing device 51 occupies an area between the transport rollers 45 and 57. This can inhibit lights reflected by opposed outer circumferential surfaces of the transport rollers 45 and 57 from entering the photographing device 51. Consequently, the problem due to the reflected lights from the transport rollers 45 and 47 can be solved only by changing the position of the photographing device 51.

<Moving Mechanism>

Figure 9:
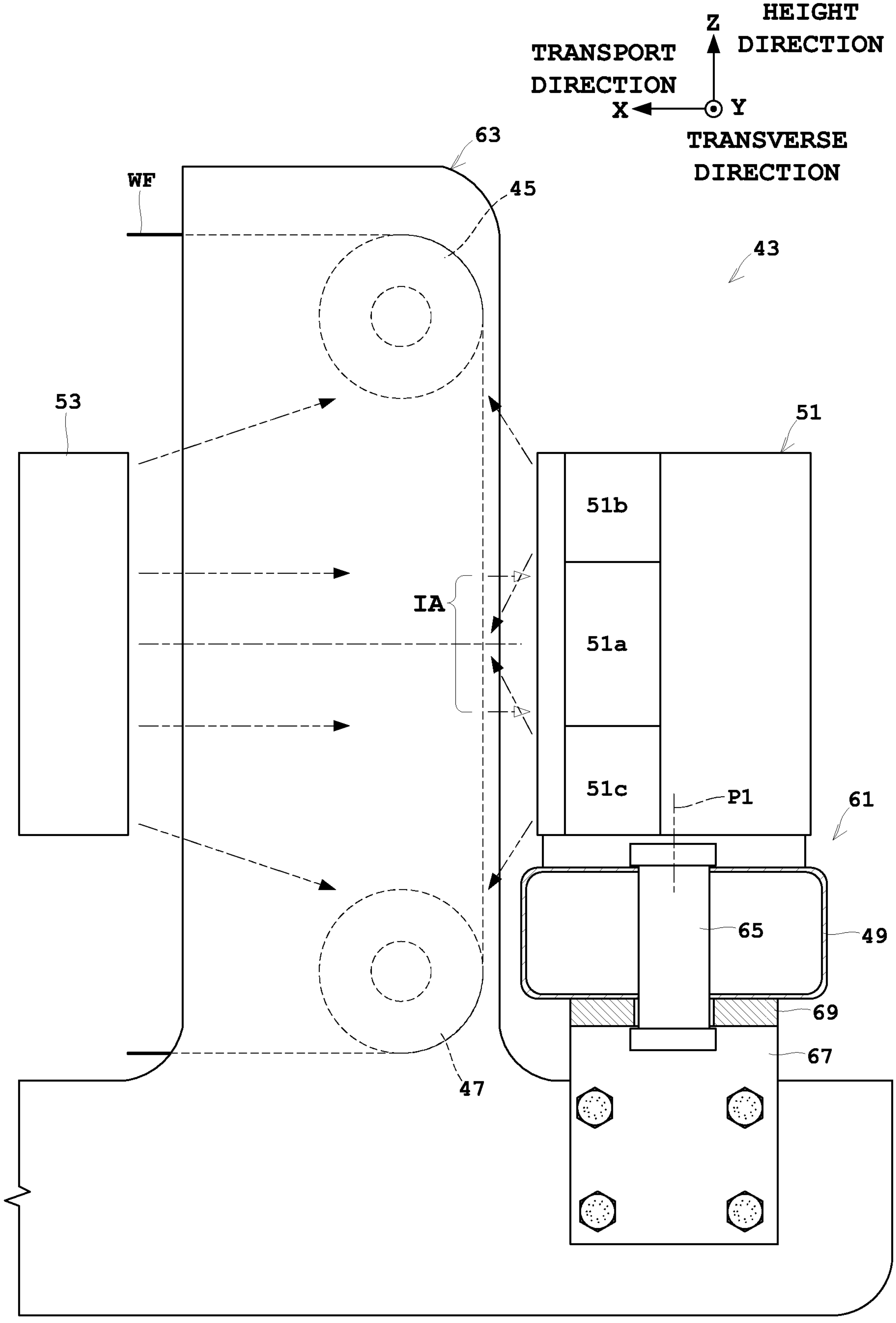
FIG. 9 is a side view of a moving mechanism in the inspecting section.
Figure 10:
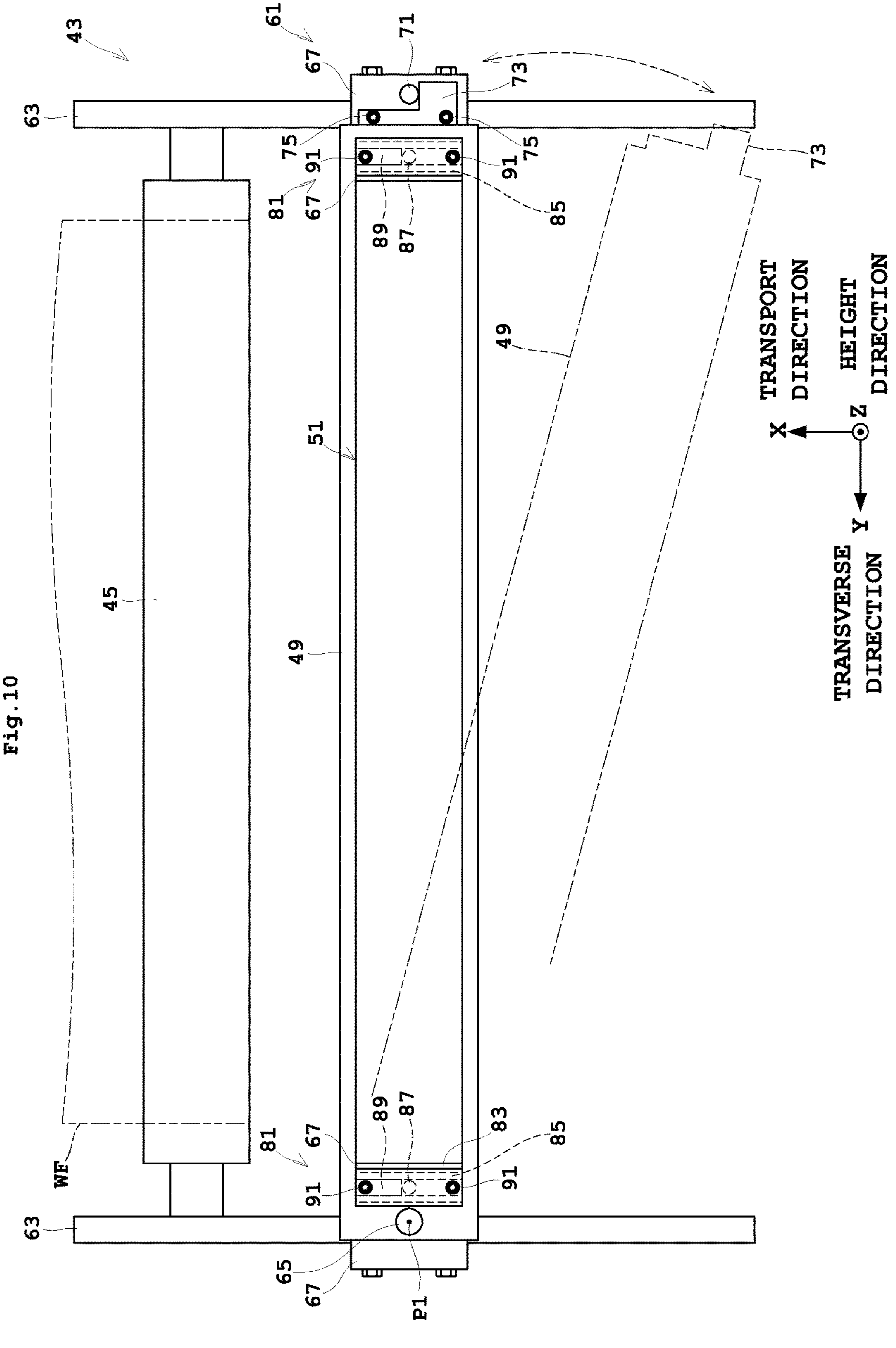
FIG. 10 is a plan view of the moving mechanism in the inspecting section.

Reference is now made to FIGS. 9 and 10. FIG. 9 is a side view of a moving mechanism in the inspecting section. FIG. 10 is a plan view of the moving mechanism in the inspecting section.

In each of Embodiments 1-5 described above, a primer layer is formed in the coating unit 5 before printing to promote fixation of the inks dispensed from the printing unit 7. Consequently, the powder of the primer layer may adhere to the photographing device 51 (especially the light incident surface), thereby interfering with accurate inspection. Also where the printing medium is paper instead of the soft wrapping film WF, paper powder may adhere to the photographing device 51 to cause the same problem. It is therefore necessary to clean regularly the surface of the photographing device 51 opposed to the printing medium transported. However, where the image sensor 51*a* of the photographing device 51 is a CIS (contact image sensor), the depth of field is shallow. There is therefore a small distance between the light transmitting surface of the photographing device 51 and the printing medium. This poses a problem that maintenance of the photographing device 51 is difficult. It is preferable to provide the following moving mechanism 61.

The moving mechanism 61 fixes the position relative to the inspection area IA of the photographing device 51 at a time of operation of the inkjet printing apparatus 1. At a time of maintenance, on the other hand, the photographing device 51 is movable to be spaced from the inspection area IA and away from the plane of the soft wrapping film WF.

Specifically, the moving mechanism 61 has an apparatus frame 63 and a swing pin 65. The transport roller 45 and transport roller 47 are rotatably attached to the apparatus frame 63. In particular, the transport rollers 45 and 47 have rotary shafts extending in the transverse direction Y with opposite ends thereof rotatably attached to the apparatus frame 63. The swing pin 65 is inserted adjacent one end of a frame 49 on which the photographing device 51 is mounted. The swing pin 65 is placed to have an axis thereof extending parallel to the plane of the soft wrapping film WF. The apparatus frame 63 has a support plate 67 erected adjacent the one end of the frame 49. The support plate 67 has a pin stop plate 69 attached to an upper part thereof. The swing pin 65 projects downward from the frame 49, and has a lower part thereof inserted in the pin stop plate 69. Consequently, as shown in a two-dot chain line in FIG. 10, the frame 49 can swing about a pivot axis P1 of the swing pin 65 along an upper surface of the support plate 67 and along a plane defined by the transport direction X and transverse direction Y. In other words, the photographing device 51 can swing with the frame 49 along the plane defined by the transport direction X and transverse direction Y.

The above frame 49 corresponds to the "photographing device frame" in this invention.

The apparatus frame 63 has a frame positioning pin 71 which restricts a position of the other end of the frame 49 to place the photographing device 51 in a focusing position for focusing on the soft wrapping film WF. Specifically, the apparatus frame 63 has the support plate 67 attached thereto on the opposite side in the transverse direction Y of the swing pin 65. The frame positioning pin 71 is attached to an upper part of the support plate 67. The frame positioning pin 71 has a lower part thereof embedded in the support plate 67, and an upper part projecting in the height direction Z from the upper surface of the support plate 67. An L-plate 73 is attached to a side surface at the other end of the frame 49. The L-plate 73 assumes a shape of letter L of the alphabet in plan view as shown in FIG. 10. The L-plate 73 has a portion horizontal in the transverse direction Y, which portion contacts the frame positioning pin 71. The L-plate 73 in contact with the frame positioning pin 71 is fixed to the support plate 67 with screws 75, thereby fixing the position of the frame 49.

With the moving mechanism 61 provided as above, the photographing device 51 can be moved away from the plane of the soft wrapping film WF at the time of maintenance. Consequently, powder and the like released from the soft wrapping film WF can easily be removed from the photographing device 51. This enables accurate inspection to be performed over a long period of time. Further, with the frame positioning pin 71, the position of the frame 49 at the other end of the frame 49 is restricted to place the photographing device 51 in the focusing position. Consequently, after swinging the frame 49 for maintenance of the photographing device 51, photography by the photographing device 51 restored can be performed appropriately.

Figure 11:
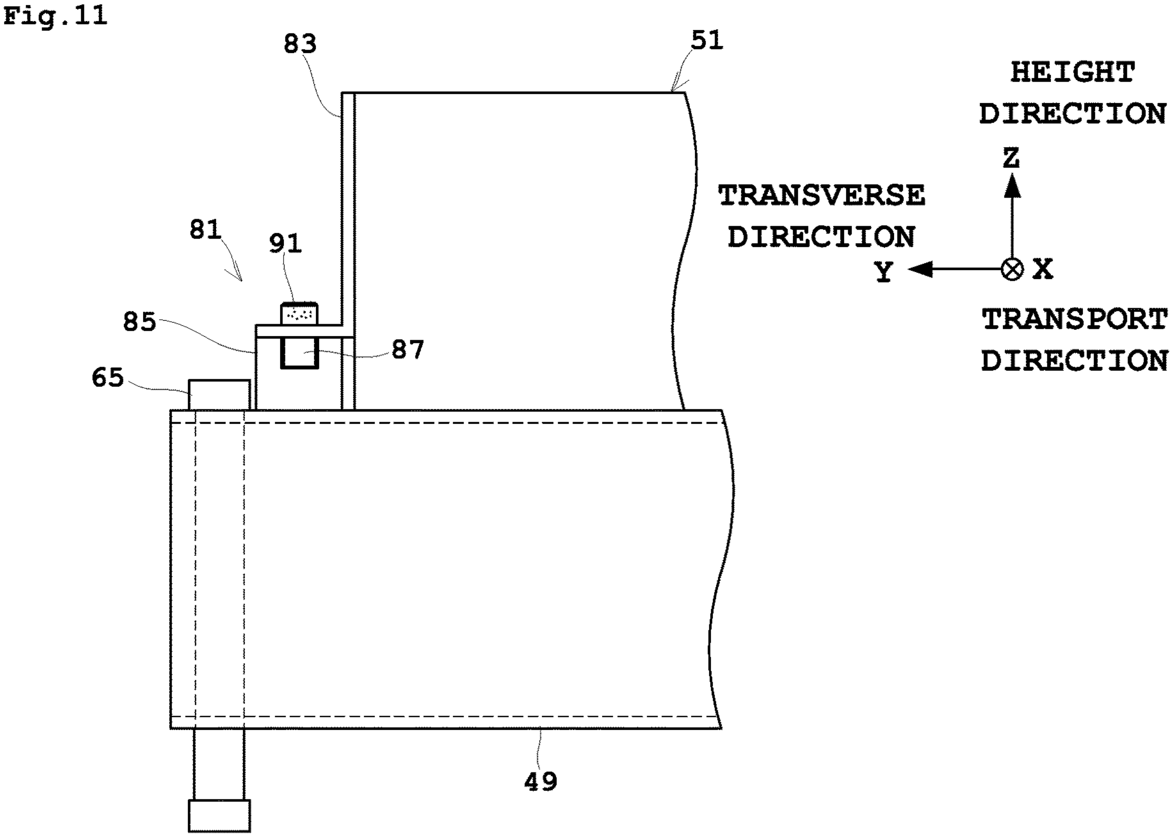
FIG. 11 is a front view of a photographing device moving mechanism in the inspecting section.
Figure 12:
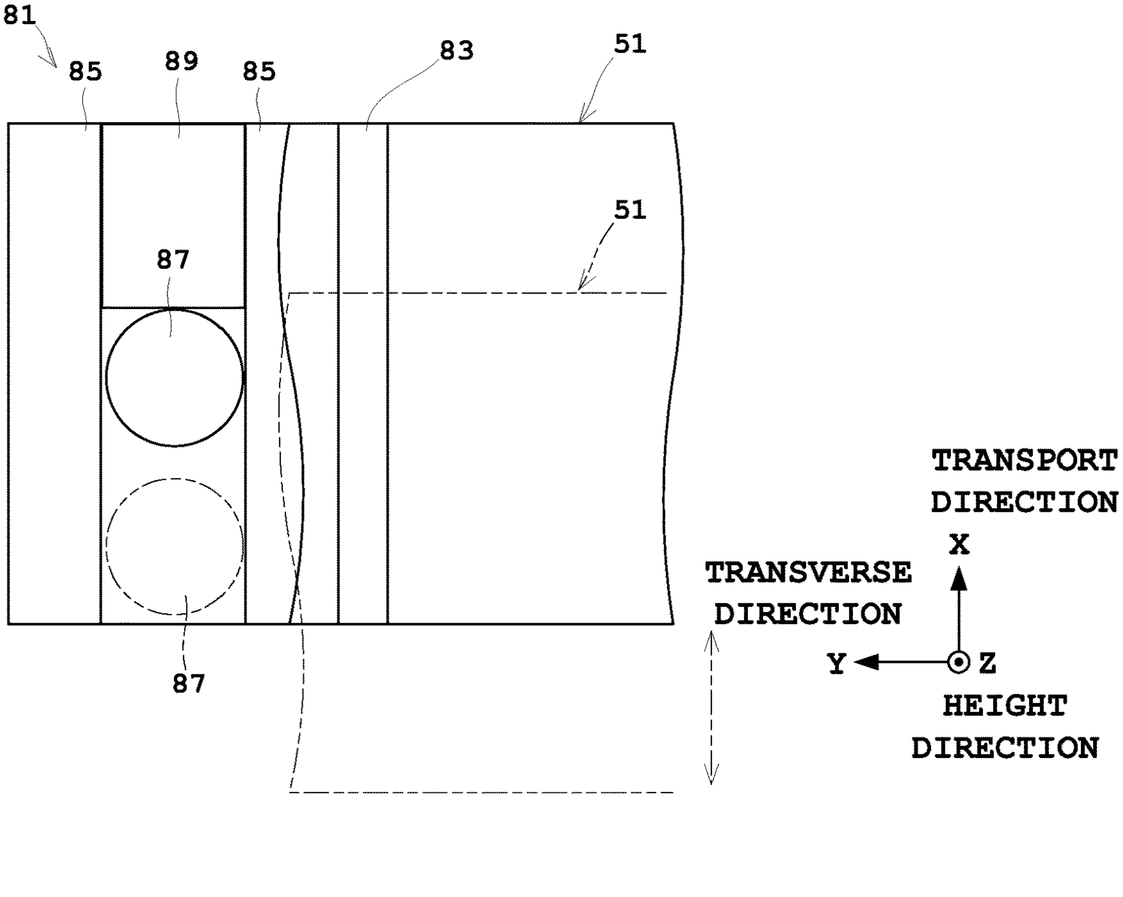
FIG. 12 is a plan view of the photographing device moving mechanism in the inspecting section.

The frame 49 preferably is constructed as shown in FIGS. 10 to 12. FIG. 10 is a plan view of the moving mechanism in the inspecting section. FIG. 11 is a front view of a photographing device moving mechanism in the inspecting section. FIG. 12 is a plan view of the photographing device moving mechanism in the inspecting section.

That is, the frame 49 preferably has a photographing device moving mechanism 81 for enabling movement of the position in the transport direction X of the photographing device 51 relative to the inspection area IA.

The photographing device moving mechanism 81 has mounting plates 83, rails 85, photographing device positioning pins 87, restrictor pieces 89, and screws 91.

The mounting plates 83 are attached to opposite end regions in the transverse direction Y of the photographing device 51. Each mounting plate 83 assumes a shape of letter L. Each rail 85 is attached to the frame 49 below the mounting plate 83. The rail 85 has a groove in a middle portion thereof seen in the transport direction X. In the rail 85 the groove is formed along the transport direction X. Each photographing device positioning pin 87 is attached to the mounting plate 83 to project downward from a lower surface thereof. Each restrictor piece 89 is fixedly provided in the groove of the rail 85. The restrictor piece 89 is fixed as opposed to the soft wrapping film WF in the transport direction X. When the photographing device 51 is moved along the transport direction X with the photographing device positioning pin 87 inserted in the groove of the rail 85, the photographing device positioning pin 87 will contact the restrictor piece 89 to restrict the movement. This position is set as a focusing position where the photographing device 51 focuses on printed images in the inspection area IA of the soft wrapping film WF. The screws 91 are attached in the state where the photographing device positioning pin 87 contacts the restrictor piece 89 to restrict the movement. Consequently, the photographing device 51 is fixed to the frame 49 in the focusing position.

Thus, with the photographing device moving mechanism 81, the photographing device 51, even if moved at the time of maintenance, can easily be set to the focusing position.

This invention is not limited to the foregoing embodiments, but may be modified as follows:

(1) Each foregoing embodiment has been described taking the soft wrapping film WF which is transparent film as an example of printing medium. However, this invention is not limited to such printing medium. For example, this invention is applicable also to translucent film and translucent paper medium.

(2) In each foregoing embodiment, the inkjet printing apparatus 1 has the coating unit 5 for forming primer layers. However, it is not necessary to provide the coating unit 5 where the printing unit 7 dispenses oil-based ink.

(3) In each foregoing embodiment, the inspecting section 43 or 43A-43D has the upper reflected light source 51*b* (51*b*1) and lower reflected light source 51*c* (51*c*1). However, this invention does not necessarily need to provide two reflected light sources.

(4) In each foregoing embodiment, the inspecting section 43 or 43A-43D has the transmitted light source 53. However, this invention does not need the transmitted light source 53 as indispensable. That is, the invention is applicable where only reflected light sources such as the upper reflected light source 51*b* and lower reflected light source 51*c* are provided, since they can inhibit adverse effects of the reflection from the transport rollers 45 and 57 due to the reflected light sources. The invention is applicable also where only the transmitted light source 53 is provided.

This invention may be embodied in other specific forms without departing from the spirit or essential attributes thereof and, accordingly, reference should be made to the appended claims, rather than to the foregoing specification, as indicating the scope of the invention.

What is claimed is:

1. An inspecting apparatus for reading print images printed on a transparent printing medium and inspecting printing states, the apparatus comprising:

a first transport roller for transporting the transparent printing medium;

a second transport roller spaced from the first transport roller without a configuration for supporting the transparent printing medium being provided between the first transport roller and the second transport roller, the second transport roller being disposed downstream from the first transport roller in a transport direction, for transporting the transparent printing medium;

a photographing device disposed between the first transport roller and the second transport roller, and opposed to one surface of the transparent printing medium, for photographing the print images located in an inspection area set between the first transport roller and the second transport roller; and a light emitting device for emitting light for the photographing device to photograph the print images located in the inspection area, and including at least a transmitted light source located opposite the photographing device across the transparent printing medium, wherein the first transport roller and the second transport roller have outer circumferential surfaces thereof each with a light absorbing member for absorbing the light from the light emitting device.

2. The inspecting apparatus according to claim 1, wherein the light absorbing member is a black tape provided with antireflection treatment.

3. The inspecting apparatus according to claim 1, wherein the light absorbing member is a needlelike construction with numerous recesses and numerous projections, and with a black coat.

4. The inspecting apparatus according to claim 1, wherein:

printing heads are arranged upstream of the inspecting apparatus for printing images by dispensing ink droplets to the transparent printing medium; and the inspecting apparatus is configured to inspect the images printed by the printing heads.

5. The inspecting apparatus according to claim 1, wherein the first transport roller and the second transport roller are arranged at an interval by which the outer circumferential surface of the first transport roller and the outer circumferential surface of the second transport roller are located within areas irradiated by light from the transmitted light source.

* * * * *